Aug. 14, 1962  C. A. OTTERSON  3,049,326
PIPE HANGER
Filed Sept. 12, 1960
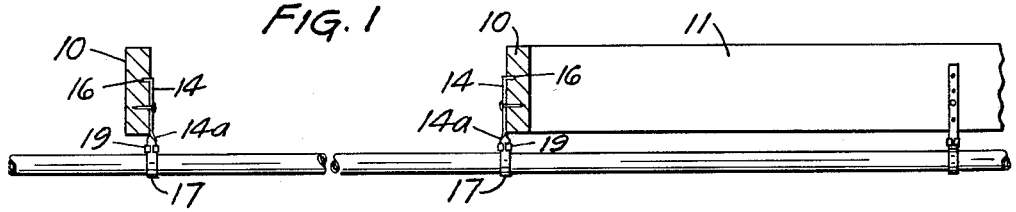
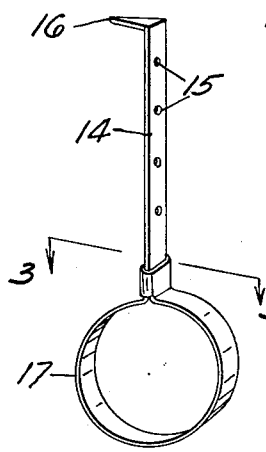
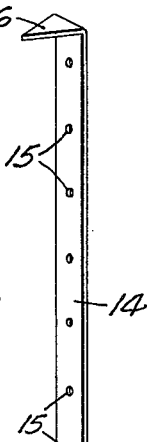
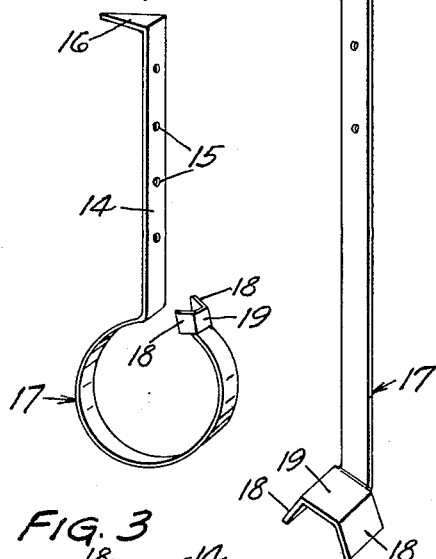
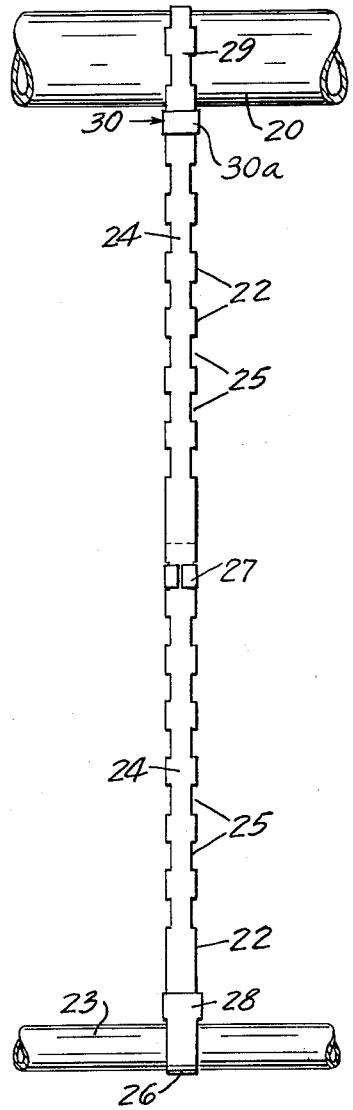
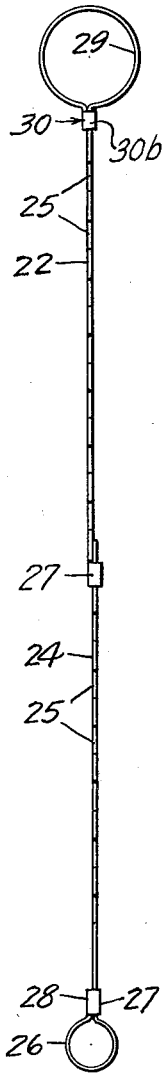
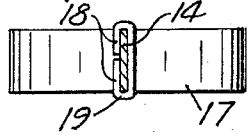
INVENTOR
CLIFFORD A. OTTERSON
BY Williamson + Palmatier
ATTORNEYS United States Patent Office 3,049,326
Patented Aug. 14, 1962

3,049,326
PIPE HANGER
Clifford A. Otterson, 17320 Excelsior Blvd.,
Hopkins, Minn.
Filed Sept. 12, 1960, Ser. No. 55,276
2 Claims. (Cl. 248—59)

This invention relates to pipe-hangers and more particularly to self-tightening pipe hangers.

An object of this invention is to proivde a novel self-tightening pipe-hanger, of simple and inexpensive construction, for securely suspending a pipe from a support.

Another object of this invention is to provide a novel and improved self-tightening pipe-hanger including a looped pipe-engaging portion adapted to extend around a pipe for support thereof and arranged and constructed to progressively tighten against the pipe when the latter is subjected to a downwardly directed component of force.

Another object of this invention is to provide a novel and improved self-tightening sectional pipe hanger and including a plurality of interconnected similar sections adapted to securely suspend a pipe from a support regardless of the size and shape of the support.

A still further object of this invention is to provide a novel and improved self-tightening pipe hanger for readily supporting a pipe from a support and which is arranged and constructed to progressively constrict against the outer surface of the pipe when the latter is subjected to vibration, thus eliminating pipe chatter.

These and other objects and advantages of my invention will more fully appear from the following description made in connection accompanying drawings wherein like character references refer to the same or similar parts throughout the several views, and in which:

FIG. 1 is a cross sectional view of a conventional floor structure foreshortened for clarity and which illustrates my novel pipe hanger in its supporting relation with a pipe;

FIG. 2 is an enlarged perspective view of the pipe hanger illustrated at the right side of FIG. 1;

FIG. 3 is a transverse section taken approximately along line 3—3 of FIG. 2 and looking in the direction of the arrows;

FIG. 4 is a perspective view of the pipe hanger as shown in FIG. 2 but illustrating the pipe hanger prior to the application thereof to a pipe;

FIG. 5 is a perspective view of the pipe hanger illustrated in FIG. 2 but illustrating the configuration of the hanger before the looped portion is formed;

FIG. 6 is a side elevational view of a different embodiment of my novel pipe hanger shown in supporting relation with a pipe, the pipe hanger structure; and FIG. 7 is an end elevational view of the embodiments shown in FIG. 6, the pipe hanger.

Referring now to the drawings and more specifically to FIG. 1, it will be seen that one embodiment of my novel pipe hanger construction is shown connected to a supporting structure such as a floor joist for suspension therefrom. Actually, one of the pipe hangers is shown connected to a wooden floor joist 10 while another of the pipe hangers is illustrated as being attached to a transversely extending floor joist 11. Each of the pipe hangers is designated in its entirety by the reference numeral 12, and each is shown supporting a pipe 13 from a floor joist. The pipe supported by my novel pipe hanger may be a water-conducting conduit or the like.

Referring now to FIGS. 2 to 5, it will be seen that the pipe hanger 12 includes an elongate substantially flat shank portion 14 having a plurality of apertures 15 formed therein. It will be noted that the free terminal end of the shank 14 is pointed and is laterally bent to define an attachment element 16 adapted to be driven into the side of a wooden beam such as a floor joist 10 or 11.

My novel pipe hanger 12 also includes a pipe-engaging portion 17 which, as seen in FIGS. 2 and 4, is bendable to define a pipe-engaging loop. The terminal portion of the pipe engaging portion 17 is provided with a pair of laterally extending tabs 18 and it will be noted that these tabs, as best seen in FIG. 3, are each of a width not greater than the width of the shank portion 14. With this arrangement, the tabs when bent to lie against the shank as illustrated in FIGS. 2 and 3 cooperate with the end portion of shank to define a noose designated by the reference numeral 19 which may be cinched up tight against the outer circumferential surface of the pipe.

It will be noted that the pipe-engaging portion 17 and shank 14 are of integral construction and are a uniform width. My novel pipe hanger 12 is preferably formed from a flat, rigid metallic material such as copper or galvanized steel since water conduits often sweat and copper or galvanized steel will not.

It will be seen that the pipe-engaging portion, when bent defines a loop, as best seen in FIG. 4, and this loop 17 may be readily positioned around a pipe and the tabs may thereafter be bent to lie against the shank 14, as illustrated in FIGS. 2 and 3, to thereby form a noose 19. This noose 19 may be slipped longitudinally of the shank 14 to cause the loop to tighten against the outer circumference of the pipe. The shank may be temporarily attached to a supporting joist by merely positioning the shank against the side of the joist and driving the pointed end 16 into the side of the joist. Other securing means such as nails or the like may hereafter be driven through the apertures 15 to more firmly secure the shank to the supporting beam. The noose defined by the laterally extending tabs 18 and the terminal portion of the pipe engaging portion 17 adjustably cooperates with the shank so that the pipe hanger may be readily used on also any size pipe within the limits of the pipe-engaging portion. When a downward pull is exerted on the pipe, the noose will be caused to constrict the loop to thereby cause the pipe-engaging portion 17 to tighten against the circumference of the pipe.

This self-tightening feature of my novel pipe hanger eliminates the pipe chatter and the resulting noise associated with the pipe. This pipe chatter is caused generally by rapid pressure built up in the pipe which results from a water outlet being closed. Since the shank 14 of the pipe hanger 12 will be securely attached to the joist, any movement of the pipe resulting from such vibrations as pipe chatter serves to cause the noose 19 to move longitudinally of the shank 14 and to thereby cause the tightening of the pipe-engaging portion about the pipe. It will also be noted that the noose 19 also permits the pipe-engaging loop portion 17 to be initially tightened against the pipe in a more secure manner than any heretofore known structure while the self-tightening feature eliminates pipe chatter in the event the pipe hanger is not securely tightly affixed to the pipe.

The pipe hangers 12 may be packaged or shipped without preforming the loops and will have the configuration as illustrated in FIG. 5 of the drawing. This permits compact packaging and also allows the user to form the loop desirable to meet the particular pipe size. After the loop is formed but prior to the formation of the noose 19 a pipe may be positioned within the untightened noose and temporarily suspended from the hanger 12 thus permitting the pipe to be worked on and adjusted. It will be noted that the shank portion 14 may be twisted about its longitudinal axis 90° as illustrated in the pipe hanger 12 at the left of FIG. 1 and this twist 14a in the shank may be preformed or may be formed after the pipe is secured within the pipe engaging portion of the hanger.

Referring now to FIGS. 6 and 7, it will be seen that another embodiment of my novel pipe hanger construction is shown depending from a large supporting pipe 20 and a pipe hanger 21 actually includes a plurality of interconnected sections 22 the uppermost of which is connected to the supporting pipe 20 while the lowermost engages and supports a pipe 23. Actually, each of these sections 22 is identical in construction and each includes a shank 24 having a plurality of notches 25 formed in each of the longitudinal side edges thereof. These notches 25 are arranged in opposed pairs the function of which will more fully be described hereinafter.

Each of the pipe-hanger sections 22 also includes a pipe-engaging portion 26 which, as shown in FIGS. 6 and 7, is bendable to form a loop for receiving a pipe therein. The terminal portion of this pipe-engaging portion 26 is provided with a pair of laterally extending tabs which extend in opposite directions from opposite edges of this terminal portion. These tabs 27 when bent flatwise to lie against the shank 24 define a noose 28 which embraces the loop in the manner of the embodiment of FIGS. 1 to 5. Since the embodiment shown in FIG. 6 and FIG. 7 includes a plurality of sections 22 interconnected together, only the lowermost of these sections will have the pipe-engaging portion bent to define a pipe-receiving loop inasmuch as the tabs 27 of the remaining sections will engage and embrace the shank 24 of the next adjacent section.

When a plurality of the sections are interconnected together it will be seen that the tabs 27 of one section may be bent to lie flatwise against the shank 24 and with each tab cooperating with one of the notches 25 of a selected pair of the next adjacent sections to prevent the interconnected sections from slipping longitudinally.

The uppermost of the sections 22 is adapted for ready connection to any shaped supporting member such as a pipe 20. Connection of this uppermost section 22 to the supporting pipe 20 is accomplished by arcuately bending the terminal portion 29 of the shank 24 upon itself to define a loop which, as seen in FIGS. 6 and 7, extends around the supporting pipe. A small U-shaped clip 30 having a bight portion 30a and legs 36b extends around this terminal portion 29 of the uppermost section when the former is bent upon itself and the U-shaped clip cooperates with the notches of the shank to secure the arcuately bent end portion 29 to the remaining portion of the shank. This particular manner of connecting the pipe hanger to an overhead support permits the hangers to be used with any kind of supports such as pipes, angle irons or beams, and several of the sections may be used to form the attachment means of the pipe hanger so that the pipe hanger may be used with any size support. It is also understood, of course, that only one of the sections 22 may be used to suspend a pipe from a support, especially if the overhanging support is of relatively small cross-sectional size.

It will, therefore, be seen from the preceding paragraphs that I have provided a novel pipe hanger structure which is readily attachable to an overhanging support regardless of the shape and size of the support.

It will also be seen from the foregoing description that my novel pipe hanger which is arranged and constructed to progressively constrict against a pipe thus eliminating vibration of the pipe.

It will also be seen from the above paragraphs that I have provided a novel pipe hanger of relatively simple and inexpensive construction and arranged and constructed to function in a more efficient manner than any heretofore known comparable devices.

It will, of course, be understood that various changes may be made in the form, details, arrangement and proportions of the various parts without departing from the scope of my invention.

What I claim is:

1. A self-tightening pipe hanger for suspending a pipe from a support, said pipe hanger comprising an elongate substantially flat shank having a plurality of longitudinally spaced notches in opposite edges thereof, said notches being arranged in opposed pairs, attachment means cooperating with said notches for attaching one end portion of said shank in depending relation from a support, a pipe-engaging portion integrally formed with the other end portion of said shank and being bendable to define a substantially circular loop for snugly embracing a pipe for support thereof, the terminal portion of said pipe-engaging portion having a pair of tabs integrally formed therewith and extending laterally in opposite direction from the edges thereof, said tabs when bent flat wise to lie against said shank cooperating therewith to define a noose embracing said shank for tightening the pipe-engaging portion against a pipe when said pipe-engaging portion is bent into a pipe-engaging loop.

2. A self-tightening sectional pipe hanger for suspending a pipe from a support, said pipe hanger including a plurality of identical elongate sections interconnected together in longitudinally extending relation and each including an elongate shank having a plurality of notches in each longitudinal edge thereof, the notches of each section being arranged in opposed pairs, each of said sections including a pipe-engaging portion integrally formed with one end of its associated shank and extending longitudinally therefrom, the terminal portion of each of said pipe-engaging portions having a pair of oppositely extending tabs integrally formed therewith and extending laterally from opposite edges thereof, the tabs of the adjacent end of each section being bent to embrace the shank of each adjacent section and cooperating with a selected pair of notches thereof for securing said sections together, the shank of the uppermost of said sections being arcuately bent upon itself to extend around a support, said pair of tabs securing the bent portions of the shank together, the pipe-engaging portion of the lowermost of said sections being bendable to define a substantially circular loop for embracing a pipe for support thereof, the tabs of said last-mentioned pipe-engaging portion when bent flatwise to lie against its associated shank for operating therewith to define a noose embracing said last-mentioned shank for tightening the pipe-engaging portion of the lowermost section against a pipe when said last-mentioned pipe-engaging portion is bent into a pipe-engaging loop.

References Cited in the file of this patent

UNITED STATES PATENTS

| | | |
|---|---|---|
| 1,175,802 | Orcutt | Mar. 14, 1916 |
| 2,004,448 | Sansonetti | June 11, 1935 |
| 2,193,215 | Witter | Mar. 12, 1940 |
| 2,229,129 | Riegelman | Jan. 21, 1941 |

FOREIGN PATENTS

| | | |
|---|---|---|
| 162,957 | Switzerland | July 31, 1933 |